United States Patent [19]
Hara et al.

[11] Patent Number: 5,233,370
[45] Date of Patent: Aug. 3, 1993

[54] METHOD AND APPARATUS OF EXPOSURE FOR CORRECTING ELECTROSTATIC LATENT IMAGE OUTLINE

[75] Inventors: Kei Hara; Osamu Kobuse, both of Shizuoka, Japan

[73] Assignee: Tokyo Electric Co., Ltd., Tokyo, Japan

[21] Appl. No.: 912,745

[22] Filed: Jul. 13, 1992

[30] Foreign Application Priority Data

Jul. 18, 1991 [JP] Japan ................................. 3-177945
Jul. 18, 1991 [JP] Japan ................................. 3-177946

[51] Int. Cl.$^5$ ...................... G01D 15/14; G03G 15/04
[52] U.S. Cl. ................................ 346/160; 346/107 R; 355/69; 358/475
[58] Field of Search .................. 355/1, 229, 214, 69; 346/107 R, 160; 358/458, 475

[56] References Cited

U.S. PATENT DOCUMENTS

| 4,394,662 | 7/1983 | Yoshida et al. | 346/160 X |
| 4,868,587 | 9/1989 | Loce et al. | 346/160 X |
| 5,128,696 | 7/1992 | Watanabe | 346/160 X |
| 5,142,337 | 8/1992 | Karidis et al. | 355/239 X |

Primary Examiner—Fred L. Braun
Attorney, Agent, or Firm—Oblon, Spivak, McClelland, Maier & Neustadt

[57] ABSTRACT

An exposure method for use in an image forming apparatus for having each of edge emission type electroluminescent (EL) devices emit light a plurality of times to form one pixel of an image. The gradient of the image outline relative to the horizontal scanning direction is checked to see if it falls in one of two ranges: between 0° and 45°, or between 45° and 90°. If the gradient falls between 0° and 45°, the edge emission type EL devices are made to emit light selectively according to the proportion of image-filled regions in the pixels intersected by the outline. If the gradient falls between 45° and 90°, either the light intensity of the edge emission type EL devices is established according to the proportion of image-filled regions in the pixels intersected by the outline, or the number of the pulses which exceed a threshold voltage and which are fed to the edge emission type EL devices is gradually reduced according to reductions of image-filled regions in the pixels intersected by the outline.

6 Claims, 7 Drawing Sheets

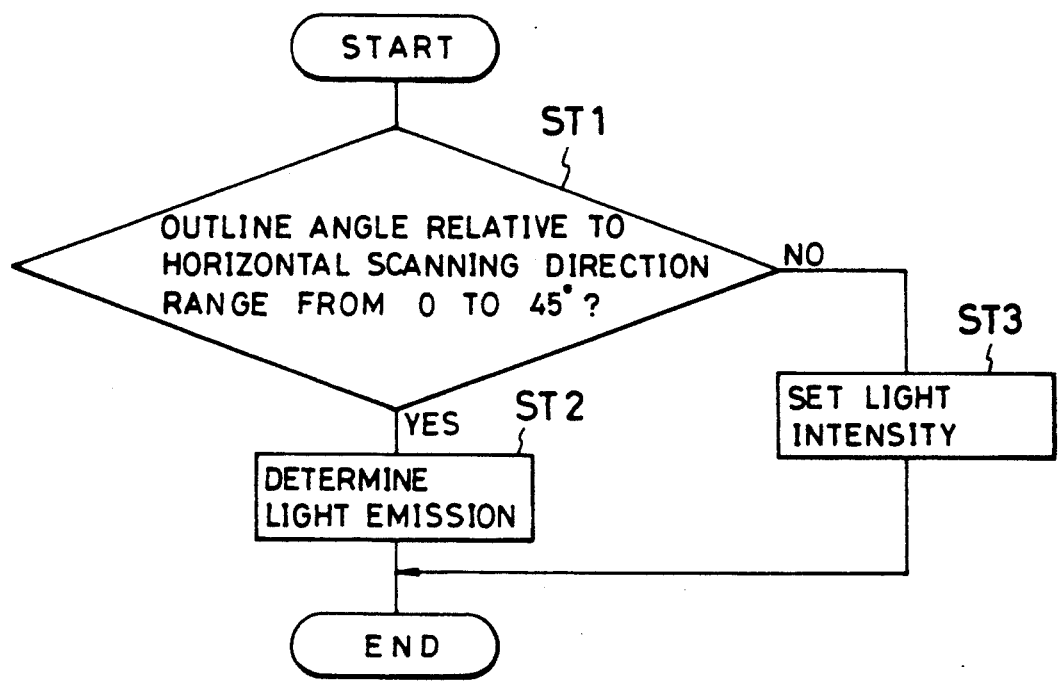
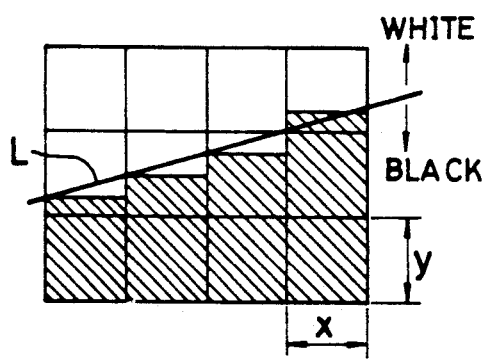
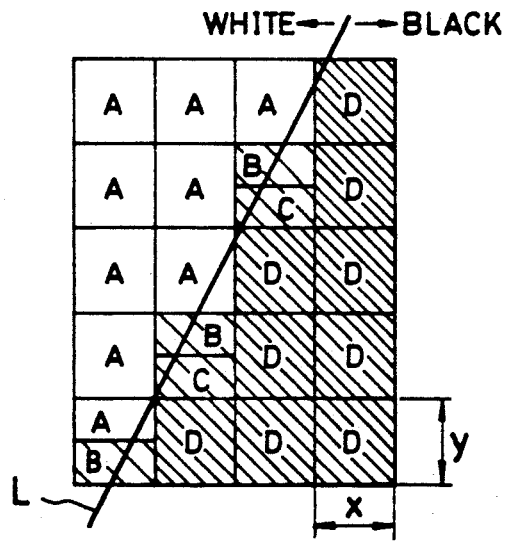

METHOD AND APPARATUS OF EXPOSURE FOR CORRECTING ELECTROSTATIC LATENT IMAGE OUTLINE

FIELD OF THE INVENTION AND RELATED ART STATEMENT

The present invention relates to a method and apparatus of exposure for forming electrostatic latent images on a photosensitive body by electrophotography and, more particularly, to a method and apparatus of exposure for correcting the outline of electrostatic latent images.

Recent years has seen the advent of a new type of line printer. They typically have a line head positioned opposite to a photosensitive body, the head comprising a large number of edge emission type electroluminescent (EL) devices arranged in the horizontal scanning direction. The outer circumference of the photosensitive body is electrically charged. When a group of edge emission type EL devices of the line head emits light to the charged portion, an electrostatic latent image is formed over the photosensitive body. The electrostatic latent image is developed and transferred onto a sheet of paper. Each of the edge emission type EL devices on the line head is made of a thin film active layer enclosed by a dielectric substance, the thin film active layer containing zinc sulfide and other active elements, both sides of the dielectric substance having electrodes. This type of EL device is quicker in responsiveness and far more enhanced in light intensity than conventional light emitting devices. FIG. 13 shows part of an image obtained conventionally based on print data. In the figure, x stands for the size of one pixel in the horizontal scanning direction; and y, for the size of one pixel in the vertical scanning direction. The width of an edge emission type EL device in the horizontal scanning direction corresponds to x, and the thickness of the device matches one of a plurality of parts making up its width. Thus, when the drum-shaped photosensitive body rotates, one edge emission type EL device emits light a plurality of times to form one pixel of an electrostatic latent image.

As depicted in FIG. 13, the ideal outline L of the image is inclined relative to the horizontal scanning direction depending on the print data. As long as the image is constituted in units of pixels, it is impossible to approximate the outline to a straight line; the outline of the electrostatic latent image is bound to be jagged.

One conventional way to minimize the jaggedness of the outline is as follows: Because a light emission from each edge emission type EL device forms a compressed rectangle that is horizontally long and vertically short, edge emission type EL devices are made to emit light selectively depending on how each fringe pixel of the image is intersected by the outline. Meanwhile, one pixel is formed by a plurality of emissions, and one emission forms one of a plurality of components constituting one pixel. Thus each pixel is made of a plurality of flat-shaped pixel components arranged vertically. When the image is formed not in units of pixels but in units of pixel components, the jaggedness of the outline is appreciably reduced.

The above prior art method is effective when the gradient of the outline L is small relative to the horizontal scanning direction. This is because the emission from each edge emission type EL device forms a compressed rectangle that is vertically short. However, as illustrated in FIG. 14, when the gradient of the outline L relative to the horizontal scanning direction exceeds 45° and becomes closer to 90°, setting the number of emissions in units of pixel components still leaves a significant amount of image-filled regions outside the outline L. Inside the outline L, there grow blank regions within the image. These characteristics pronounce the jaggedness of the outline, not diminish it.

OBJECT AND SUMMARY OF THE INVENTION

It is therefore an object of the present invention to provide an exposure method for forming an electrostatic latent image with an outline of reduced jaggedness.

It is another object of the invention to provide an exposure apparatus capable of implementing the inventive exposure method.

In carrying out the invention and according to one aspect thereof, there is provided an exposure method for use in an image forming apparatus having a large number of edge emission type electroluminescent (EL) devices, the horizontal width of each of the devices being greater than the vertical thickness thereof, the devices being arranged in the horizontal scanning direction and positioned opposite to a photosensitive body so that as the photosensitive body rotates, one edge emission type EL device emits light a plurality of times onto the surface of the body to form one pixel of an electrostatic latent image; the method comprising the steps of: determining one of a first and a second case of print data, the first case being one in which the gradient of the outline of the electrostatic latent image relative to the horizontal scanning direction falls between 0° and 45°, the second case being one in which the gradient of the same outline relative to the horizontal scanning direction falls between 45° and 90°; causing, in the first case, the edge emission type EL devices t emit light selectively according to the proportion of image-filled regions in the pixels intersected by the outline; setting, in the second case, the light intensity of the edge emission type EL devices according to the proportion of image-filled regions in the pixels intersected by the outline; and gradually reducing, alternatively in the second case, the number of pulses applied to the edge emission type E devices according to reductions of image-filled regions in the pixels intersected by the outline, the pulses exceeding a predetermined threshold voltage value.

When the gradient of the image outline relative to the horizontal scanning direction is judged to be smaller than 45°, the edge emission type EL devices are made to emit light selectively according to the proportion of image-filled regions in the pixels intersected by the outline. This feature takes advantage of the compressed rectangle shape of each edge emission type EL device in minimizing the image-filled regions extending outside of the outline and the blank regions inside thereof. When the regions flanking the outline are minimized, the jaggedness of the outline is made less conspicuous. When the gradient of the image outline relative to the horizontal scanning direction is judged to be greater than 45°, there are two options. Either the light intensity of the edge emission type EL devices is reduced according to the proportion of image-filled regions in the pixels intersected by the outline; or the number of pulses applied to the edge emission type EL devices is gradually reduced according to reductions of image-filled regions in the pixels intersected by the outline, the pulses exceeding a predetermined threshold voltage value. This lowers the luminous density of the image portions extending outside the outline and thereby makes the jaggedness of the outline less pronounced visually. Further objects, features and advantages of the invention will become more apparent upon reading the following description and appended drawings.

BRIEF DESCRIPTION OF THE DRAWINGS

FIG. 1 (b) is a schematic view showing how a line head is positioned relative to a photosensitive body in the first embodiment of FIG. 1 (a);

FIG. 2 is a flowchart of steps in which the first embodiment of FIG. 1 (a) works;

FIG. 3 is a schematic view of part of an image printed in the first embodiment using print data;

FIG. 4 is a schematic view of part of another image printed in the first embodiment using print data;

DETAILED DESCRIPTION OF PREFERRED EMBODIMENTS

Figure 1A:
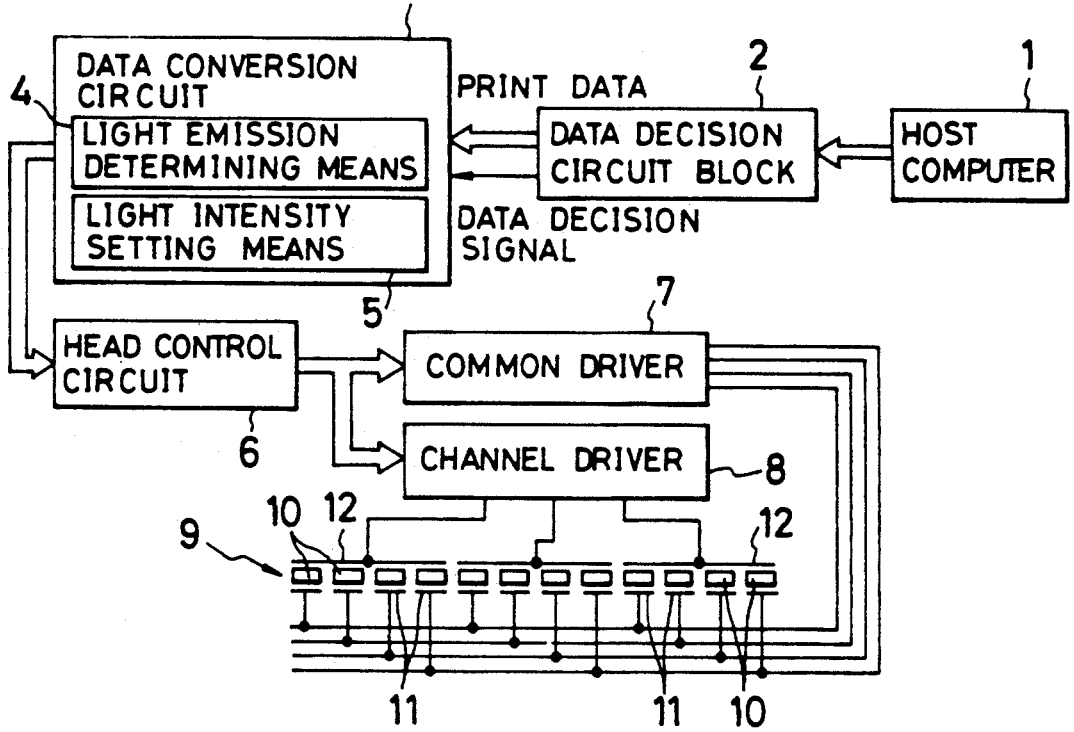
FIG. 1 (a) is an electronic circuit diagram of a first embodiment of the invention.

The first embodiment of the invention will now be described with reference to FIGS. 1 through 6. FIG. 1(a) is an electronic circuit diagram of an exposure apparatus practiced as the first embodiment of the invention. In the first embodiment, as illustrated, a host computer 1, a data decision circuit block 2 and a data conversion circuit 3 are connected in series. The host computer 1 is an external input unit, and the data decision circuit block 2 is data determining means that constitutes part of the apparatus. Print data transferred from the host computer 1 to the data decision circuit block 2 are bit map-based or outline font-based print data. In any case, the data about the gradient of an image outline relative to the horizontal scanning direction is included in the print data. This allows the data decision circuit block 2 receiving the print data to determine one of two ranges in which the gradient of the outline falls: one between 0° and 45°, the other between 45° and 90°. A data decision signal resulting from the above determination is output together with the print data to the data conversion circuit 3. The data conversion circuit comprises light emission determining means 4 and light intensity setting means 5. When the gradient of the outline falls between 0° and 45°, the light emission determining means 4 determines the light emitting action of edge emission type EL devices (to be described later) according to the proportion of image-filled regions in the pixels intersected by the outline. When the gradient of the outline falls between 45° and 90°, the light intensity setting mean 5 sets the light intensity of edge emission type EL devices according to the proportion of image-filled regions in the pixels intersected by the outline. A head control circuit 6, also included in the first embodiment, forwards a driving signal from the light emission determining means 4 and another driving signal from the light intensity setting means 5 to a common driver 7 and a channel driver 8, respectively. A line head 9 comprises a large number of edge emission type EL devices 10 arranged in the horizontal scanning direction on a substrate 25, as shown in FIG. 1 (b). These devices 10 are each made of a thin film active layer enclosed by a dielectric substance, the thin film active layer containing zinc sulfide and other active elements, both sides of the dielectric substance having common electrodes 11 and channel electrodes 12. The common electrodes 11 are connected to the common driver 7, and the channel electrodes 12 to the channel driver 8.

Figure 1B:
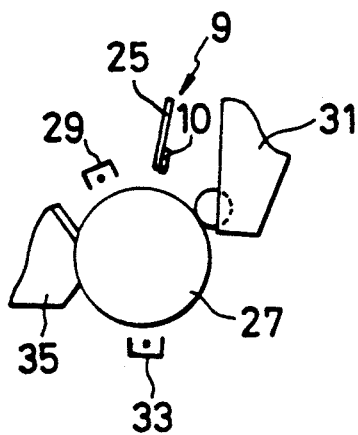

As shown in FIG. 1(b), the line head 9 is positioned opposite to a photosensitive body 27. Around the photosensitive body 27 are positioned a charging unit 29, a developing unit 31, a transfer unit 33 and a cleaning unit 35 of the known type each. These units operate in conventional ways, and descriptions of their workings are thus omitted.

Figure 5A:
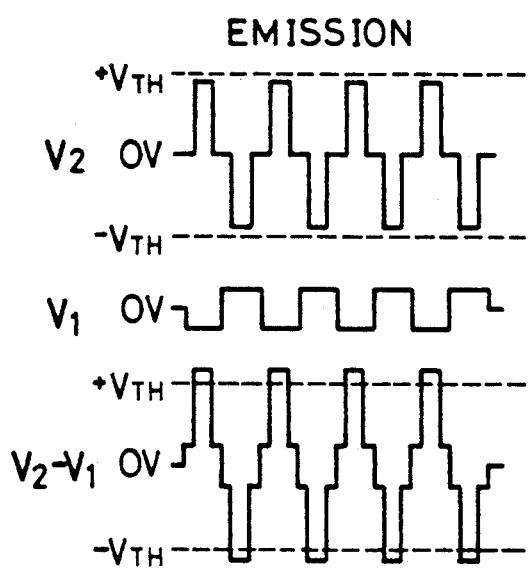
FIGS. 5(a) and 5(b) are a set of timing charts showing voltage pulses applied to common electrodes and to channel electrodes in the first embodiment.
Figure 5B:
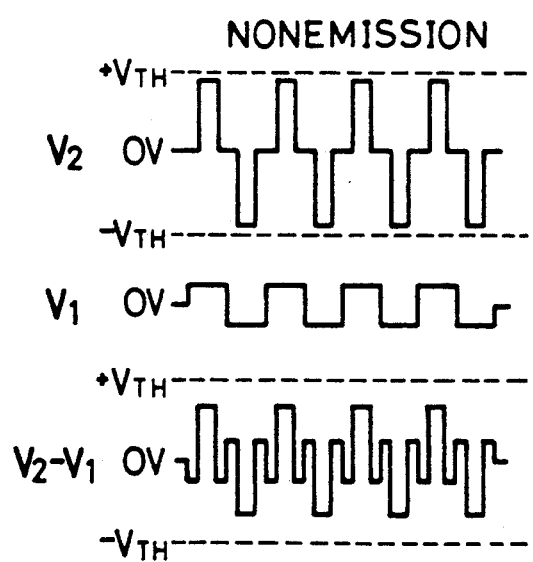

In operation, each channel electrode 12 is supplied with low-voltage pulses $V_1$ of a positive-negative symmetrical amplitude, and each common electrode 11 is fed with high-voltage pulses $V_2$ of also a positive-negative symmetrical amplitude, as illustrated in FIG. 5. The high-voltage pulses $V_2$ are close to a threshold voltage $\pm V_{TH}$. Application of the pulses causes a pulse voltage difference $V_2 - V_1$ to be sent to the edge emission type EL device 10. When the pulses $V_1$ and $V_2$ are controlled appropriately in synchronism, an emission state of FIG. 5 (a) and a non-emission state of FIG. 5(b) are obtained.

Figure 6A:
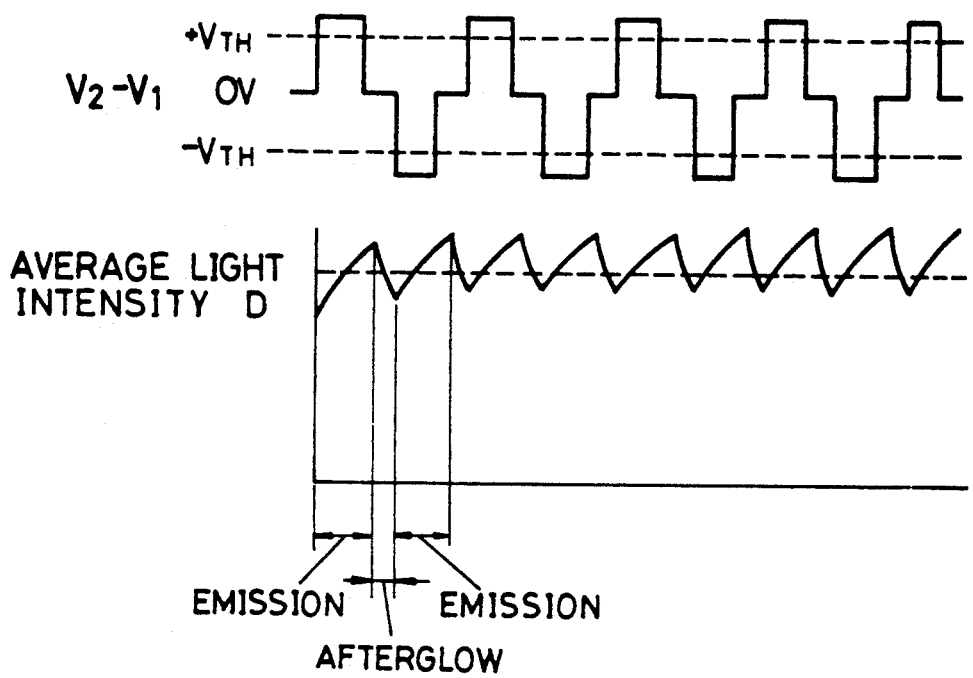
FIGS. 6(a) and 6(b) are a set of timing charts depicting the relationships between light intensity and pulses applied to edge emission type EL devices in the first embodiment.
Figure 6B:
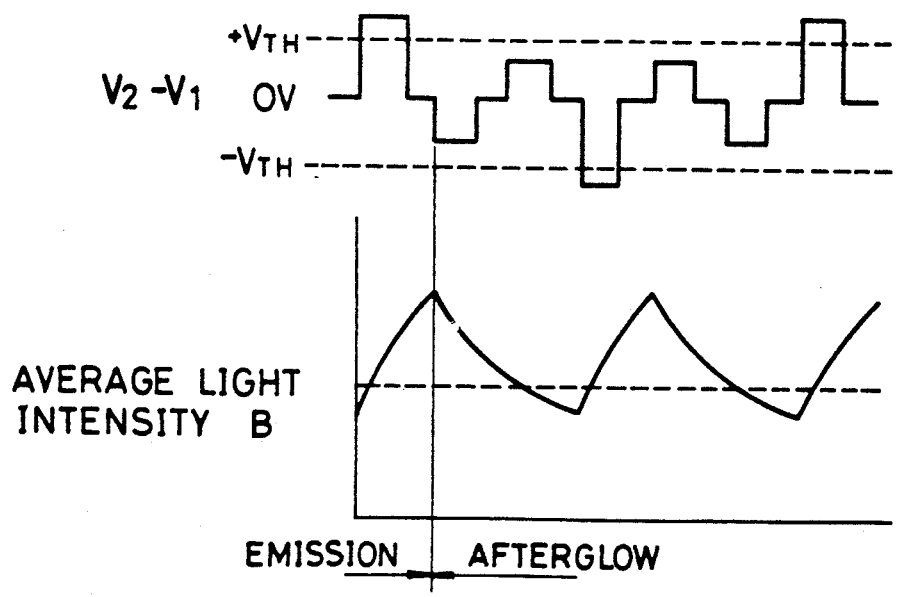

Thus as shown in FIG. 6, the edge emission type EL device 10 emits light when fed with pulses exceeding the threshold value of $\pm V_{TH}$ and having a positive-negative symmetrical amplitude. The light intensity of each emission gradually increases, then peaks off followed by an afterglow. FIG. 6(a) illustrates how an average light intensity D remains high because of a short emission peak-to-peak cycle when the edge emission type EL device 10 is fed continuously with pulses exceeding the threshold value of $\pm V_{TH}$. FIG. 6(b), on the other hand, depicts how an average light intensity B remains lower than D because of a longer emission peak-to-peak cycle when the edge emission type EL device 10 is fed with pulses exceeding the threshold value of $\pm V_{TH}$ every three peaks. The latter average light intensity B is so controlled as to occur at any of four levels depending on the application frequency of pulses exceeding the threshold value of $\pm V_{TH}$. The four levels are: non-emission (A), weak emission (B), medium emission (C) and strong emission (D). The light intensity is necessarily proportional to the voltage value of the electrostatic latent image formed on the photosensitive body.

How the exposure in the first embodiment actually takes place will now be described with reference to the flowchart of FIG. 2. The apparatus initially enters step ST1 after getting started. In step ST1, based on the print data sent from the host computer 1, the data decision circuit block 2 determines one of two ranges that the gradient of the image outline relative to the horizontal scanning direction falls in: one between 0° and 45°, the other between 45° and 90°. The result of the determination (i.e., a data decision signal) is output together with the print data to the data conversion circuit 3. If the gradient of the image outline relative to the horizontal scanning direction is judged to fall between 0° and 45°, step ST2 is taken. In step ST2, the light emission determining means 4 determines the light emitting action of edge emission type EL devices 10 according to the proportion of image-filled regions in the pixels intersected by the outline. If, in step ST1, the gradient of the image outline relative to the horizontal scanning direction is judged to fall between 45° and 90°, step ST3 is taken. In step ST3, the light intensity setting means 5 sets the light intensity of edge emission type EL devices 10 according to the proportion of image-filled regions in the pixels intersected by the outline.

FIGS. 3 and 4 sketch parts of images obtained by the first embodiment using print data. These are examples that contain outlines L having gradients relative to the horizontal scanning direction. FIG. 3 shows an example in which the gradient of the outline L relative to the horizontal scanning direction is less than 45. In this case, edge emission type EL devices 10 are driven selectively based on the light emission data from the light emission determining mean 4. This reduces the number of pixel components in the image-filled regions of the pixels intersected by the outline, the reduction being achieved depending on the proportion of such regions in those pixels. As a result, the image-filled regions extending outside the outline L are minimized, and the jaggedness of the outline L becomes much less pronounced.

FIG. 4 shows an example in which the gradient of the outline L relative to the horizontal scanning direction is greater than 45° and closer to the vertical scanning direction. In this case, the frequency of supplying edge emission type EL devices 10 with pulses exceeding the threshold value of $\pm V_{TH}$ is established on the basis of the light intensity (A, B, C or D) set by the light intensity setting means 5. This lowers the luminous density of the image portions extending outside the outline L, thereby subduing the jaggedness of the outline visually. In FIG. 4, the concentration of oblique lines corresponds to the light intensity level (A, B, C or D), i.e., the concentration is proportional to the luminous density involved.

Figure 7:
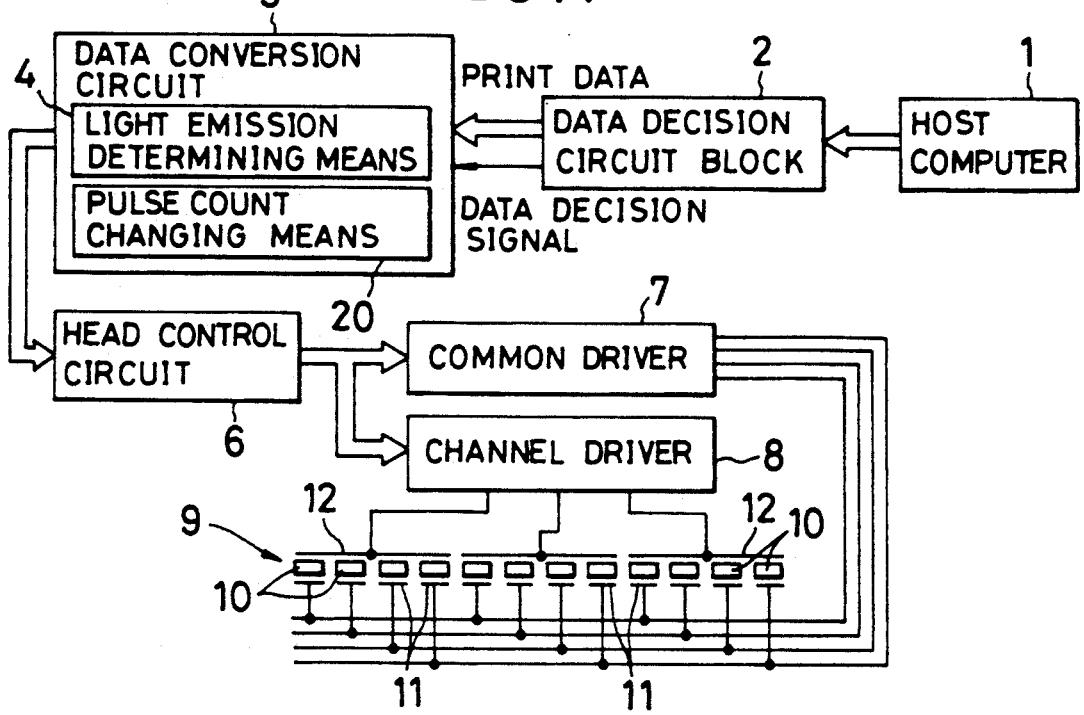
FIG. 7 is an electronic circuit diagram of a second embodiment of the invention.

The second embodiment of the invention will now be described with reference to FIGS. 7 through 12. Both in the second embodiment and in the first embodiment, like reference characters designate like or corresponding parts. FIG. 7 is an electronic circuit diagram of an exposure apparatus practiced as the second embodiment of the invention. As illustrated, the second embodiment comprises a host computer 1, a data decision circuit block 2 and a data conversion circuit 3 connected in series. The host computer 1 is an external input unit, and the data decision circuit block 2 is data determining means that constitutes part of the apparatus. Print data transferred from the host computer 1 to the data decision circuit block 2 are bit map-based or outline font-based print data. In any case, the data about the gradient of an image outline relative to the horizontal scanning direction is included in the print data. This allows the data decision circuit block 2 receiving the print data to determine one of two ranges in which the gradient of the outline falls: one between 0° and 45°, the other between 45° and 90°. A data decision signal resulting from the above determination is output together with the print data to the data conversion circuit 3. The data conversion circuit 3 comprises light emission determining means 4 and pulse count changing means 20. When the gradient of the outline falls between 0° and 45°, the light emission determining means 4 determines the light emitting action of edge emission type EL devices (to be described later) according to the proportion of image filled regions in the pixels intersected by the outline. When the gradient of the outline falls between 45° and 90°, the pulse count changing means 20 gradually reduces the number of pulses which exceed a predetermined threshold voltage and which are fed to edge emission type EL devices 10. Thus, the pulse count reduction is achieved according to reductions of image filled regions in the pixels intersected by the outline. A head control circuit 6, also included in the second embodiment, forwards a driving signal from the light emission determining means 4 and another driving signal from the pulse count changing means 20 to a common driver 7 and a channel driver 8, respectively. A line head 9 comprises a large number of edge emission type EL devices 10 arranged in the horizontal scanning direction on a substrate, not shown. These devices 10 are each made of a thin film active layer enclosed by a dielectric substance, the thin film active layer containing zinc sulfide and other active elements, both sides of the dielectric substance having common electrodes 11 and channel electrodes 12. The common electrodes 11 are connected to the common driver 7, and the channel electrodes 12 to the channel driver 8.

In operation, each channel electrode 12 is supplied with low-voltage pulses $V_1$ of a positive-negative symmetrical amplitude, and each common electrode 11 is fed with high-voltage pulses $V_2$ of also a positive-negative symmetrical amplitude, as illustrated in FIG. 5 in connection with the first embodiment. The high voltage pulses $V_2$ are close to a threshold voltage $\pm V_{TH}$. Application of the pulses causes a pulse voltage difference $V_2 - V_1$ to be sent to the edge emission type EL device 10. When the pulses $V_1$ and $V_2$ are controlled appropriately in synchronism, an emission state of FIG. 5(a) and a non-emission state of FIG. 5(b) are obtained.

Figure 8:
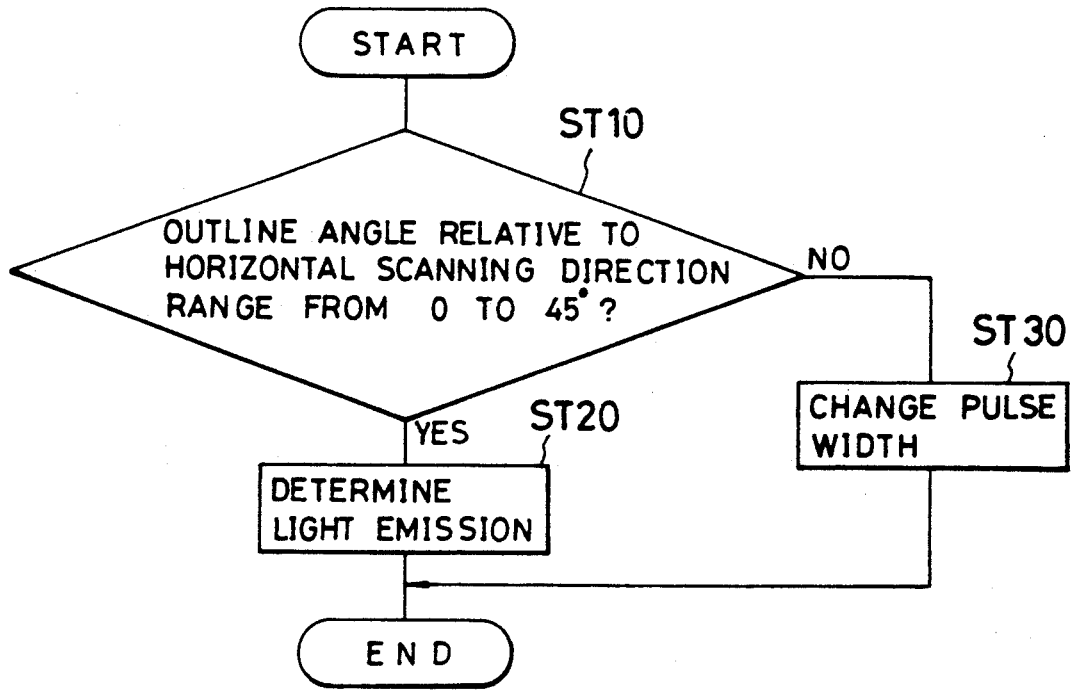
FIG. 8 is a flowchart of steps in which the second embodiment works.

How the exposure in the second embodiment actually takes place will now be described in more detail with reference to the flowchart of FIG. 8. In step ST10, based on the print data sent from the host computer 1, the data decision circuit block 2 determines one of the two ranges that the gradient of the image outline relative to the horizontal scanning direction falls in: one between 0° and 45°, the other between 45° and 90°. The result of the determination (i.e., a data decision signal) is output together with the print data to the data conversion circuit 3. If the gradient of the image outline relative to the horizontal scanning direction is judged to fall between 0° and 45°, step ST20 is taken. In step ST20, the light emission determining means 4 determines the light emitting action of edge emission type EL devices 10 according to the proportion of image-filled regions in the pixels intersected by the outline. If, in step ST10, the gradient of the image outline relative to the horizontal scanning direction is judged to fall between 45° and 90°, step ST30 is taken. In step ST30, the pulse count changing means 20 gradually reduces the number of pulses which exceed a predetermined threshold voltage and which are fed to edge emission type EL devices 10, the pulse count reduction being achieved according to reductions of image-filled regions in the pixels intersected by the outline.

Figure 9:
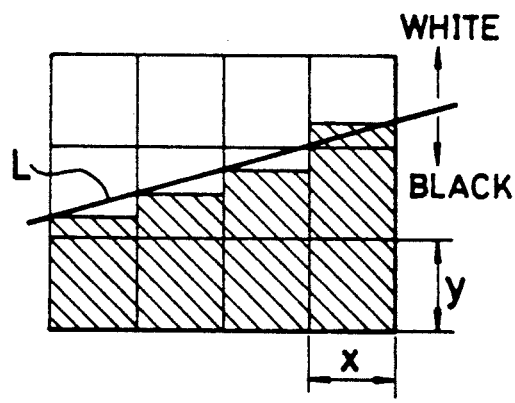
FIG. 9 is a schematic view of part of an image printed in the second embodiment using print data.
Figure 10:
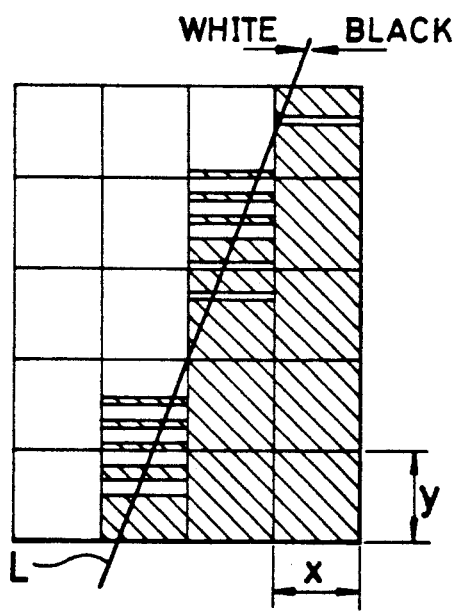
FIG. 10 is a schematic view of part of another image printed in the second embodiment using print data.

FIGS. 9 and 10 sketch parts of images obtained by the second embodiment using print data. These are examples that contain outlines L having gradients relative to the horizontal scanning direction. FIG. 9 shows an example in which the gradient of the outline L relative to the horizontal scanning direction is less than 45°. In this case, edge emission type EL devices 10 are driven selectively based on the light emission data from the light emission determining means 4. This reduces the number of pixel components in the image-filled regions of the pixels intersected by the outline, the reduction being achieved depending on the proportion of such regions. As a result, the image-filled regions extending outside the outline L are minimized, and the jaggedness of the outline L becomes much less pronounced.

Figure 11:
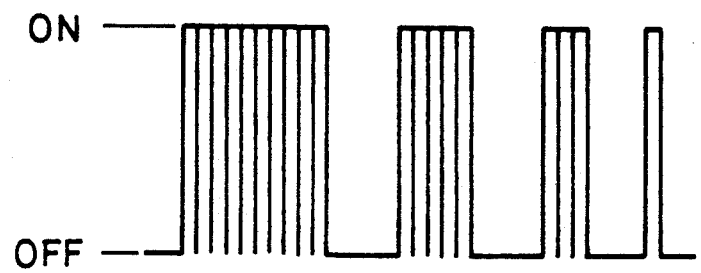
FIG. 11 is a timing chart indicating how the number of pulses is changed depending on a reduced proportion of the image-filled region in one pixel, the pulses being applied to one edge emission type EL device in the second embodiment.
Figure 12:
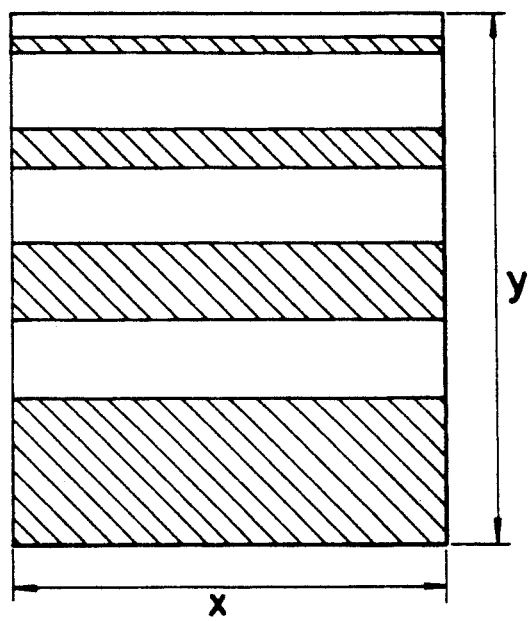
FIG. 12 is a view showing the image of one pixel which is formed after a change of a pulse count.
Figure 13:
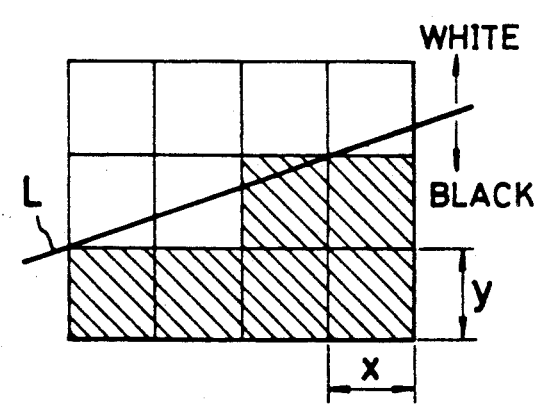
FIG. 13 is a view depicting part of an image formed conventionally based on print data.
Figure 14:
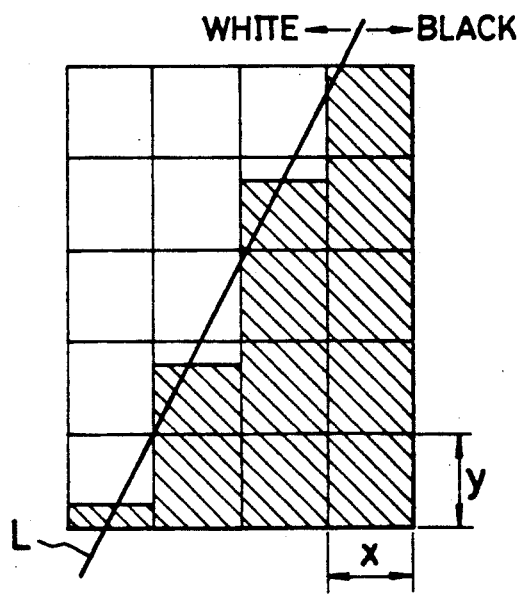
FIG. 14 is a view sketching part of another image formed conventionally based on print data.

FIG. 10 shows an example in which the gradient of the outline L relative to the horizontal scanning direction is greater than 45° and closer to the vertical scanning direction. In this case the edge emission type EL devices 10 are fed with pulses according to the pulse count established by the pulse count changing means 20. FIG. 11 is a timing chart in which the horizontal direction represents the time in which each pixel is formed, and the vertical direction indicates the amplitude of the pulses which exceed the threshold value of $\pm V_{TH}$ and which are fed to the edge emission type EL devices 10. What FIG. 11 shows is how the pulse count is gradually lowered as the proportion of image-filled regions in the pixels intersected by the outline is getting reduced. FIG. 12 sketches the image of one pixel formed by the pulse application depicted in FIG. 11. In FIG. 12, the shaded regions correspond to exposed portions (i.e., image-filled regions).

As the proportion of image-filled regions decreases in the pixels intersected by the outline L, the edge emission type EL devices 10 involved are made to emit light intermittently, as shown in FIG. 10. This provides a two-tone representation of a reduced image-filled region in each of the pixels intersected by the outline. As a result, the jaggedness of the image outline is made less conspicuous visually.

When pulses exceeding a predetermined threshold voltage are applied intermittently during formation of a single pixel, as depicted in FIG. 11, each emission grows in intensity and peaks off followed by an afterglow. This arrangement is suitable for methods and apparatuses of exposure wherein the emission cycle is relatively long.

While preferred embodiments of the invention have been described using specific terms, such description is for illustrative purposes only and it is to be understood that changes and modifications may be made without departing from the spirit or scope of the present invention. Such changes and modifications are intended to be covered by the claims.

What is claimed is:

1. An exposure method for use in an image forming apparatus having a large number of edge emission type electroluminescent devices, the horizontal width of each of the edge emission type electroluminescent devices being greater than the vertical thickness thereof, the devices being arranged in the horizontal scanning direction and positioned opposite to a photosensitive body so that as the photosensitive body rotates, one edge emission type electroluminescent device emits light a plurality of times onto the surface of the photosensitive body to form one pixel of an electrostatic latent image, the exposure method comprising the steps of:

determining one of a first and a second case of print data, the first case being one in which the gradient of the outline of the electrostatic latent image relative to the horizontal scanning direction falls between 0° and 45°, the second case being one in which the gradient of the outline relative to the horizontal scanning direction falls between 45° and 90°;

causing, in the first case, the edge emission type electroluminescent devices to emit light selectively according to the proportion of image-filled regions in the pixels intersected by the outline; and setting, in the second case, the light intensity of the edge emission type electroluminescent devices according to the proportion of image-filled regions in the pixels intersected by the outline.

2. An exposure apparatus having a large number of edge emission type electroluminescent devices, the horizontal width of each of the edge emission type electroluminescent devices being greater than the vertical thickness thereof, the devices being arranged in the horizontal scanning direction and positioned opposite to a photosensitive body so that as the photosensitive body rotates, one edge emission type electroluminescent device emits light a plurality of times onto the surface of the photosensitive body to form one pixel of an electrostatic latent image, the apparatus comprising:

data determining means for determining one of a first and a second case of print data, the first case being on in which the gradient of the outline of the electrostatic latent image relative to the horizontal scanning direction falls between 0° and 45°, the second case being one in which the gradient of the outline relative to the horizontal scanning direction falls between 45° and 90°;

light emission determining means for causing, in the first case, the edge emission type electroluminescent devices to emit light selectively according to the proportion of image-filled regions in the pixels intersected by the outline; and light intensity setting means for setting, in the second case, the light intensity of the edge emission type electroluminescent devices according to the proportion of image-filled regions in the pixels intersected by the outline;

wherein the light emission determining means and the light intensity setting means ar connected to drivers which in turn are connected to the edge emission type electroluminescent devices.

3. An exposure method for use in an image forming apparatus having a large number of edge emission type electroluminescent devices, the horizontal width of each of the edge emission type electroluminescent devices being greater than the vertical thickness thereof, the devices being arranged in the horizontal scanning direction and positioned opposite to a photosensitive body so that a the photosensitive body rotates, one edge emission type electroluminescent device emits light a plurality of times onto the surface of the photosensitive body to form one pixel of an electrostatic latent image, the exposure method comprising the steps of:

determining one of a first and a second case of print data, the first case being one in which the gradient of the outline of the electrostatic latent image relative to the horizontal scanning direction falls between 0° and 45°, the second case being one in which the gradient of the outline relative to the horizontal scanning direction falls between 45° and 90°;

causing, in the first case, the edge emission type electroluminescent devices to emit light selectively according to the proportion of image-filled regions in the pixels intersected by the outline; and gradually reducing, in the second case, the number of pulses applied to the edge emission type electroluminescent devices according to reductions of image-filled regions in the pixels intersected by the outline, the pulses exceeding a predetermined threshold voltage value.

4. An exposure apparatus having a large number of edge emission type electroluminescent devices, the horizontal width of each of the edge emission type electroluminescent devices being greater than the vertical thickness thereof, the devices being arranged in the horizontal scanning direction and positioned opposite to a photosensitive body so that as the photosensitive body rotates, one edge emission type electroluminescent device emits light a plurality of times onto the surface of the photosensitive body to form one pixel of an electrostatic latent image, the apparatus comprising:

data determining means for determining one of a first and a second case of print data, the first case being one in which the gradient of the outline of the electrostatic latent image relative to the horizontal scanning direction falls between 0° and 45°, the second case being one in which the gradient of the outline relative to the horizontal scanning direction falls between 45° and 90°;

light emission determining means for causing, in the first case, the edge emission type electroluminescent devices to emit light selectively according to the proportion of image-filled regions in the pixels intersected by the outline; and pulse count changing means for gradually reducing, in the second case, the number of pulses applied to the edge emission type electroluminescent devices according to reductions of image-filled regions in the pixels intersected by the outline, the pulses exceeding a predetermined threshold voltage value;

wherein the light emission determining means and the pulse count changing means are connected to drivers which in turn are connected to the edge emission type electroluminescent devices.

5. An exposure apparatus for forming an electrostatic latent image on a photosensitive body by exposing the photosensitive body to light in accordance with the print data representing an image defined by an outline, the apparatus comprising:

a line head made of a plurality of flat-shaped edge emission devices arranged in line, each of the edge emission devices emitting light a plurality of times to form one pixel of the electrostatic latent image, the light emission being performed at a light intensity level established in keeping with the operation of the photosensitive body, the line head relatively scanning the photosensitive body in the horizontal direction which is in parallel with the photosensitive body while relatively moving in a direction perpendicular to the horizontal direction at the same time;

means for outputting a data decision signal by comparing the gradient of the image outline represented by the print data with a predetermined angle; and data converting means for determining the operation of the edge emission devices of the line head in accordance with the data decision signal, the data converting means including, light emission determining means for determining, when the gradient is less than the predetermined angle, the number of times each of the edge emission devices of the line head emits light to form one of the pixels intersected by the outline, light intensity setting means for setting, when the gradient is greater than the predetermined angle, the light intensity of each of the edge emission devices of the line head in emitting light to form one of the pixels intersected by the outline; and means for controlling the operation of each of the edge emission devices of the line head in accordance with the data from the data converting means.

6. An exposure apparatus for forming an electrostatic latent image on a photosensitive body by exposing the photosensitive body to light in accordance with the print data representing an image defined by an outline, the apparatus comprising:

a line head made of a plurality of flat-shaped edge emission devices arranged linearly, each of the edge emission devices emitting light a plurality of times to form one pixel of the electrostatic latent image when supplied with pulses of which the voltage exceeds a predetermined threshold value, the light emission being performed in keeping with the operation of the photosensitive body, the line head relatively scanning the photosensitive body in the horizontal direction which is in parallel with the photosensitive body while relatively moving in a direction perpendicular to the horizontal direction at the same time;

means for outputting a data decision signal by comparing the gradient of the image outline represented by the print data with a predetermined angle; and data converting means for determining the operation of the edge emission devices of the line head in accordance with the data decision signal, the data converting means including, light emission determining means for determining, when the gradient is less than the predetermined angle, the number of times each of the edge emission devices of the line head emits light to form one of the pixels intersected by the outline, pulse controlling means for gradually reducing, when the gradient is greater than the predetermined angle, the number of the pulses applied to each of the edge emission devices of the line head to form one of the pixels intersected by the outline; and means for controlling the operation of each of the edge emission devices of the line head in accordance with the data from the data converting means.

* * * * *